United States Patent [19]

Portnoy et al.

[11] 4,082,617
[45] Apr. 4, 1978

[54] RECOVERY OF CHEMICAL COMPONENTS OF CELLULOSIC REGENERATING SOLUTION

[75] Inventors: Norman A. Portnoy, Hopatcong, N.J.; David Paul Anderson, Amherst, Mass.

[73] Assignee: International Telephone and Telegraph Corporation, New York, N.Y.

[21] Appl. No.: 715,422

[22] Filed: Aug. 18, 1976

[51] Int. Cl.$^2$ .......................... B01D 3/34; C08B 5/04; C08B 5/12
[52] U.S. Cl. ........................... 203/28; 203/29; 203/36; 203/37; 203/38; 203/80; 106/168; 106/311; 260/561 A; 260/643 A; 423/400; 536/38
[58] Field of Search ....................... 203/28, 29, 33, 36, 203/38, 37, 95, 71, 80, 31; 106/311, 165, 168, 169; 423/400; 536/38; 260/561 R, 561 A, 643 R, 643 A, 643 E; 201/2.5, 25

[56] References Cited

U.S. PATENT DOCUMENTS

| | | | |
|---|---|---|---|
| 1,845,665 | 2/1932 | Isham | 260/643 R |
| 2,080,064 | 5/1937 | Roelfsema | 260/643 R |
| 2,233,959 | 3/1941 | Plansoen | 106/311 |
| 2,696,508 | 11/1954 | Wilson | 260/643 R |
| 3,236,669 | 2/1966 | Williams | 106/311 |
| 3,294,651 | 12/1966 | Pasin | 260/561 |
| 3,557,207 | 1/1971 | Hammond | 260/561 |
| 3,702,843 | 11/1972 | Schweiger | 536/35 |
| 3,929,586 | 12/1975 | Slikkers | 203/37 |
| 3,959,371 | 5/1976 | Gavlin | 203/37 |

OTHER PUBLICATIONS

Venkateswaren et al., Journal of Applied Polymer Science, vol. 18, 1974, pp. 133-142.

*Primary Examiner*—Wilbur L. Bascomb, Jr.
*Attorney, Agent, or Firm*—J. B. Raden; H. J. Holt

[57] ABSTRACT

Recovery of the chemical components of a cellulosic organic solvent regenerating solution containing a dialkylacylamide, a lower aliphatic monohydric alcohol, a nitrite of the alcohol and nitric acid. The process comprises distilling the solution to remove the alcohol nitrite and alcohol, leaving the dialkylacylamide and nitric acid, recovering the alcohol, hydrolyzing to convert the alcohol nitrite to the alcohol and nitrous acid, neutralizing the nitric and nitrous acid with an alkali or alkaline earth metal oxide or hydroxide and distilling the solution to remove water and to separate and recover the remaining alcohol, the dialkylacylamide and the nitrate and nitrite salts. The nitrite and nitrate salts are converted by pyrolysis to nitrogen dioxide. The process results in substantially total recovery of the process chemicals.

11 Claims, 1 Drawing Figure

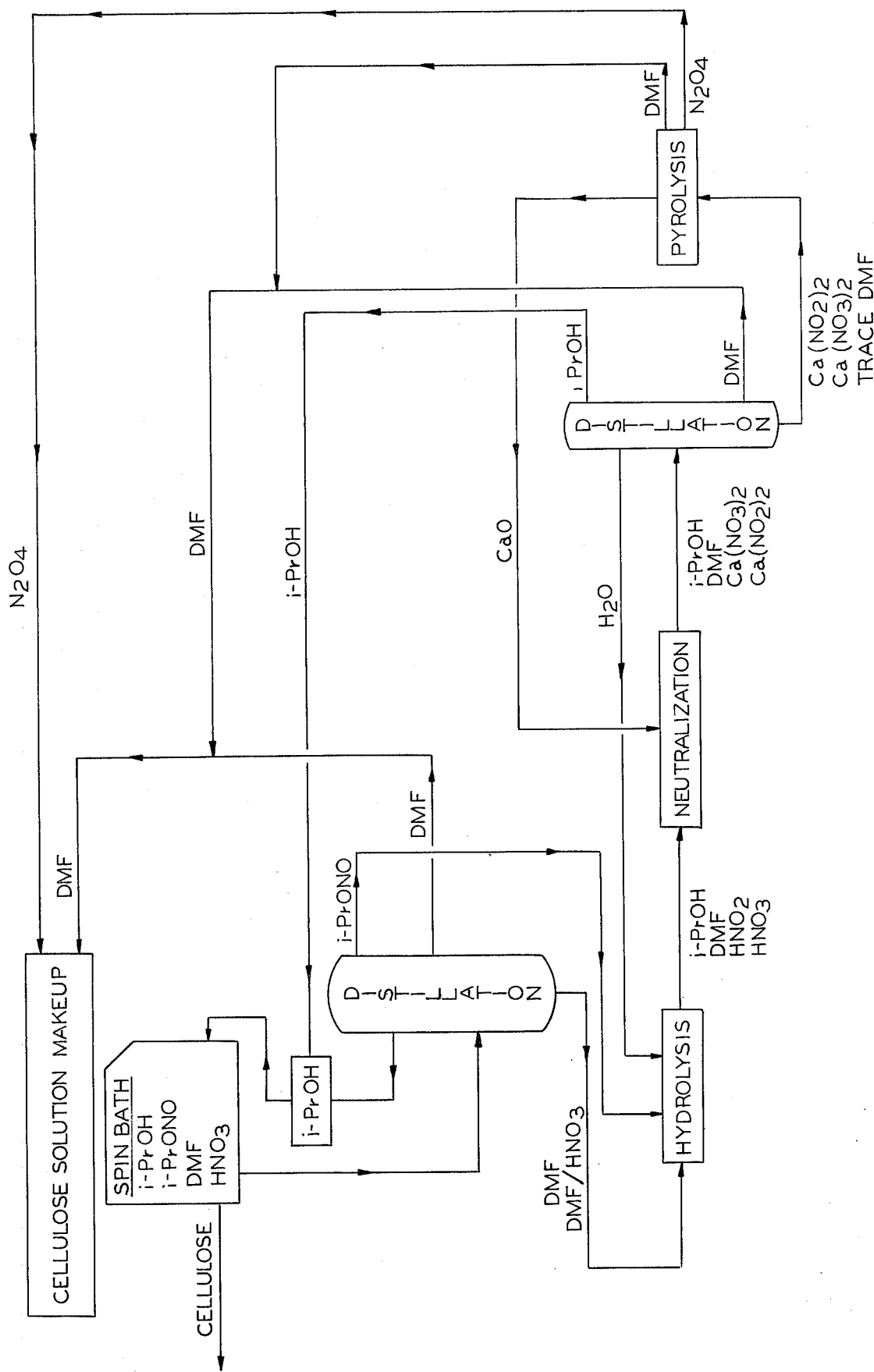

RECOVERY OF CHEMICAL COMPONENTS OF CELLULOSIC REGENERATING SOLUTION

This invention relates to a process for the separation and recovery of the chemical components of an organic solvent solution used for the preparation of regenerated cellulosic articles.

The use of organic solvent systems for dissolving cellulose and producing regenerated cellulosic products is receiving an increased amount of attention because of the cost and environmental problems associated with conventional viscose processes. One such organic solvent system consists of a dialkylacylamide solvent and dinitrogen tetroxide as a nitrosating agent. In such a system, the cellulose is regenerated from the organic solvent by contact with a nonsolvent for the cellulose which may be water or a lower alcohol. A complete description of one such organic solvent system and the regeneration of cellulose therefrom is contained in co-pending application Ser. No. 662,137, filed Feb. 27, 1976 and assigned to the present assignee. Reference should be made to the foregoing application for a more complete disclosure of such a process. Insofar as is known, there is no disclosure in the literature of a recovery system for such an organic solvent process.

Our co-pending application Ser. No. 715,223, filed of even date herewith, is directed to a recovery process for such organic solvent systems in which the cellulose is regenerated by contact with a regenerant which, in its specific form, is water or water containing a reactive base.

It is a primary object of this invention to provide a simple and effective process for the recovery and recycle of the components of organic solvent regenerating systems which utilize lower alcohols as the regenerant and which process involves essentially no release of chemicals to the air or stream.

An additional object is the separation and recovery of the alcoholic component of a celulosic regeneration solution.

The regenerating solutions with which the present recovery system is useful contain a dialkylacylamide solvent, a lower aliphatic monohydric alcohol, a nitrite of said alcohol and nitric acid. The separation of the alcoholic compound of the regeneration solution is accomplished by distilling the solution to separate the alcohol which is then recovered. The distillation occurs in the presence of a chemical complex which forms between the dialkylacylamide solvent and the nitric acid, the complex having a substantially higher boiling point than the alcohol or the alcohol nitrite. The distillation step also removes the alcohol nitrite which boils at a lower temperature than the alcohol and which may be returned to the regenerating solution remaining after distillation. The remaining components of the regenerating solution are then separated and recovered by hydrolyzing the alcohol nitrite in the remaining solution to convert the alcohol nitrite to the corresponding alcohol and nitrous acid, neutralizing the hydrolyzed solution to form the metal salts of the nitrous and nitric acid, and distilling the solution to remove, separate and recover the alcohol, the dialkylacylamide and the nitrite and nitrate salts. The nitrite and nitrate salts may then be decomposed, as for example by pyrolysis, to nitrogen dioxide (or its dimer dinitrogen tetroxide-$N_2O_4$) which may be reused for cellulose regeneration.

The invention will be better understood by reference to the attached drawing in which the single FIGURE is a schematic flow diagram of one embodiment of the process of the invention.

A typical organic solvent solution of the type to which the present invention is directed contains a dialkylacylamide solvent such as dimethylformamide, the dissolved and nitrosated cellulose in the form of a cellulose nitrite ester and nitric acid. This solution is normally spun into a spin bath or otherwise contacted with an alcohol coagulant or regenerant. The regenerant, a lower aliphatic monohydric alcohol, such as methanol, ethanol, propanol or isopropanol, is illustrated for simplicity in both the flow diagram and the following discussion as isopropanol. Upon contact with the spin bath or other regenerant solution, cellulosic fibers, films or other shaped articles are regenerated and then separated and further processed as required. As shown in the flow diagram, the spin bath now contains the isopropanol regenerant (i-PrOH), isopropyl nitrite (i-PrONO), nitric acid carried into the regenerating solution from the solvent solution and the dialkylacylamide solvent, here illustrated as dimethylformamide (DMF). The concentration of nitric acid in the regenerating solution is a function of the concentration of the remaining components—dialkylacylamide, alcohol and nitrite. Although the process is effective with virtually any concentrations of the foregoing components, the concentration of nitric acid in such solutions will as a practical matter almost always vary from 1 to 12%, by weight.

The initial step of the recovery process involves removal of isopropyl nitrite and removal and recovery of the isopropyl alcohol. The boiling point of the nitric acid (83° C.) is so close to that of the alcohol (82° C.) that it would have been expected that separation by distillation of the alcohol without $HNO_3$ distillation would have been very difficult. However, it has been found that, either prior to or during distillation, a 1:1 molar complex forms between at least a portion of the DMF and all of the $HNO_3$ and the DMF/$HNO_3$ complex prevents distillation of the $HNO_3$ with the isopropyl alcohol. Distillation is preferably conducted under vacuum at an absolute pressure of, e.g., from 5 to 50 mm Hg. Distillation also removes i-PrONO (which boils at about 40°–42° C/atm.) which is preferably recombined with the solution remaining after distillation (DMF and $HNO_3$) for the following hydrolysis step. The distillation step may also remove a portion of the DMF, which is normally present in excess of the $HNO_3$ content and which has a lower boiling point than the DMF/$HNO_3$ complex. Any DMF that is removed is recycled to cellulose solution makeup. The isopropyl alcohol removed by distillation is recycled to the spin bath.

The next step of the process involves hydrolysis of the isopropyl nitrite. This step can be accomplished by contacting the nitrite with water in the presence of a material which renders them miscible. Such a solvent material may be dioxane, tetrahydrofuran, acetonitrile or other solvents in which the hydrolysis will occur. Alcoholic solutions such as the original spent spin bath, are excluded because of the interference by alcoholysis which competes with hydrolysis for the alcohol nitrite. The hydrolysis may occur autocatalytically or be preformed using an acid catalyst such as mineral acid, HCl, $H_2SO_4$, $HNO_3$ or $H_3PO_4$, or an organic acid such as benzene or p-toluene sulfonic acid, di or trichloroacetic acid or an alkylsulfonic acid. However, it is far simpler to accomplish this hydrolysis by using 1:1 DMF/$HNO_3$ complex containing excess DMF. This mixture is readily available as it constitutes the bottom fraction of the original distillation and it is especially suited as the hydrolysis medium since it meets the above stated requirements, i.e., a solvent for the reaction and a mineral acid catalyst. Thus, in the preferred practice of the invention, the isopropyl nitrite is returned to the solution and hydrolysis takes place with water in the presence of the solution remaining after distillation and separation of the alcohol.

The hydrolysis reaction proceeds in accordance with the following equation:

$$\text{i-PrONO} + \text{H}_2\text{O} \rightarrow \text{i-PrOH} + \text{HNO}_2$$

The hydrolysis reaction is necessary to release the $NO_2$ radicals associated with the isopropyl radical in isopropyl nitrite so that the $HNO_2$ and $HNO_3$ into which the original $N_2O_4$ has been distributed, can be subsequently neutralized and converted back to $N_2O_4$ which is the original nitrosation chemical.

The hydrolyzed solution is then neutralized preferably with calcium oxide or calcium hydroxide (lime). However, any one of a broad variety of basic reagents may be used including metal hydroxides, oxides and carbonates of the alkali and alkaline earth metals such as sodium or potassium. Virtually any metallic base that will neutralize $HNO_3$ and $HNO_2$, produce the metal nitrite and nitrate and decompose to $N_2O_4$ may be used including the oxides, hydroxides and carbonates of Pb, Mn, Zn, Ag, Ti, V, Sr, Bi, Be, Co, Al, Cu, Cd, Fe, Cr, and Ni.

The neutralized solution is then distilled to remove the alcoholic hydrolysis product and water which is present from the neutralization. The alcohol is returned to the spin bath and the water is recycled for the hydrolysis step. Any alcohol nitrite which has not been hydrolyzed will be recovered and recycled by additional hydrolysis passes. A metal nitrate and nitrite are formed by neutralization which may be separated by either precipitation or preferably by a second distillation step. Depending upon the metal salt which is used as the neutralizing reagent, the metal nitrate and nitrite may be either soluble or insoluble in the dialkylacylamide or alternatively may be rendered insoluble by the addition of a volatile non-solvent for the nitrate and nitrite salt such as a low molecular weight aliphatic alcohol, ketone, ester, chlorocarbon or ether. In the latter cases, the salts then can be precipitated from the hydrolysis solution. The scheme for precipitating the metal nitrate and nitrite salts is especially useful with sodium or potassium salts and preferably potassium salts as these have a limited solubility in DMF. After isolation of the salt, the DMF is recycled, without distillation, to the cellulose dissolving tank for solution makeup. The residual salt in the DMF must obviously not be enough to be detrimental to further cellulose dissolution.

However, in the preferred embodiment of this invention, the metal nitrate and nitrite formed by neutralization are separated by distillation. This is made possible by the use of a readily available and inexpensive chemical calcium hydroxide (lime) of calcium oxide as the neutralizing agent. Following neutralization with CaO, the neutralized mixture contains $Ca(NO_2)_2$ and $Ca(NO_3)_2$, which are for the most part soluble in DMF, in addition to i-PrOH, DMF and water. Neutralization breaks up the $DMF/HNO_3$ complex. The i-PrOH, DMF and water may be readily separated by a fractional distillation step in which the i-PrOH is recycled to the spin bath, the DMF is recycled to the cellulose makeup solution and the water to the hydrolysis step. The remaining metal nitrite and nitrate salts may then be recovered and the $N_2O_4$ reclaimed by, for example, pyrolysis. The latter reaction proceeds at temperatures above 600° C., preferably above 800° C. in the presence of oxygen for times varying from 1 to 3 hours, the times varying inversely with the temperature. The process produces high yields of $N_2O_4$ which may then be recycled for use in preparing the organic cellulose solvent solution. The presence of oxygen is necessary to convert the nitrous oxide formed from the nitrite to nitrogen dioxide (or $N_2O_4$). The pyrolysis reaction is more fully disclosed in our aforesaid co-pending application Ser. No. 715,223 filed of even date herewith.

Yields of the order of 95% of $N_2O_4$, 97% of DMF and 98% of isopropanol based on regenerating solution content may be achieved in accordance with the recovery system of the present invention.

The following examples illustrate the practice of the invention. All parts are by weight unless otherwise indicated.

EXAMPLE 1

A mixture totaling 408.7 g. of spent regeneration spin bath containing 78 g. of DMF and 9.9% $HNO_3$ is used. The spin bath is prepared by adding isopropyl alcohol to an 8/15/77 cellulose solution (parts by weight of cellulose/$N_2O_4$/DMF) and separating the solid regenerated cellulose fraction. The spin bath, containing isopropyl alcohol, DMF, $HNO_3$ and isopropyl nitrite is subjected to a slight vacuum sufficient to free the system of entrapped air. This slight vacuum is continued at room temperature until the isopropyl nitrite, 76.9 g., cleanly separates. The vacuum is then increased slightly, also at ambient temperature, until the isopropyl alcohol, 178.3 g., cleanly separates. The vacuum is then increased to 8-12 mm Hg. to remove between 10 and 15% (about 8.3 g.) of the total DMF at about 45° C. The isopropyl nitrite fraction is added to the DMF-$HNO_3$ mixture together with a total of 20 to 30 g. of water. The mixture plus water is allowed to remain at room temperature for a period of 2 hours after which time it is neutralized with 42 g. of CaO. The neutralized mixture is distilled at reduced pressure as in the initial distillation to give unhydrolyzed isopropyl nitrite, isopropyl alcohol, water from neutralization, DMF and a bottom fraction of $Ca(NO_2)_2$ and $Ca(NO_3)_2$. The solid residue can be pyrolyzed in a $CO_2/O_2$ sweep gas at 800° C., the $CO_2$ flow rate being about 100 ml/min. and the $O_2$ flow rate being about 50 ml/min. with a pyrolysis time of 90 minutes.

The yield of $N_2O_4$ by the above process is about 75%. However, the yield is as high as 92-95% $N_2O_4$ from the mixed salt pyrolysis if the yield of nitrous acid from the isopropyl nitrite hydrolysis is maximized. This may be done by performing the hydrolysis step in multiple stages in which each stage includes hydrolysis, neutralization and distillation, i.e., by dividing the hydrolysis medium into portions and taking the unhydrolyzed portion from each hydrolysis and hydrolyzing, neutralizing and distilling to the subsequent portion.

EXAMPLE 2

A solution containing various proportions of isopropyl alcohol/DMF/isopropyl nitrite and nitric acid was distilled at 8-12 mm Hg. to give four fractions. The isopropyl nitrite distilled at ambient temperature and the isopropyl alcohol distilled at 30°–35° C. Dimethylformamide boiled at 40°–42° C. and was thus removed until no further material distilled. The remaining undistilled material contained 1.1 moles of $HNO_3$ per 1.0 moles of DMF and accounted for greater than 95% of the $HNO_3$ initially present in the original solution. This distilled at 97° C/8mm Hg. and the oily liquid obtained contained 1.0 moles $HNO_3$ per 1.0 moles of DMF.

EXAMPLE 3

This example illustrates the pyrolysis portion of the process. Two and four hundredths parts of an equimolar $Ca(NO_3)_2$: $Ca(NO_2)_2$ mixture which had been prepared from predried salts was heated in a pyrolysis chamber at 800° C. for 90 minutes while the chamber was being swept with $CO_2$ at a rate which displaced the chamber volume every 30 seconds. The effluent gases were continuously swept through an oxidizing chamber which was swept with $O_2$ for 20 min. and air for the remaining 70 minutes both at a rate equal to the rate of the gas which was sweeping the pyrolysis chamber. This produced 1.07 parts of $N_2O_4$, 84.4% yield.

What is claimed is:

1. A process for the separation and recovery of the alcoholic component of a cellulosic regenerating solution containing a lower dialkylacylamide solvent, a lower aliphatic monohydric alcohol selected from the group consisting of methanol, ethanol, propanol and isopropanol, a corresponding nitrite of said alcohol and nitric acid, said process comprising distilling the solution to separate the alcohol therefrom, said distillation occurring in the presence of a chemical complex between said dialkylacylamide solvent and said nitric acid, said complex having a substantially higher boiling point than said alcohol or said nitrite of said alcohol, and recovering the alcohol from said distillation.

2. The process of claim 1, in which the alcohol nitrite is also separated by said distillation, returned to the solution remaining after distillation and hydrolyzed in said solution to the corresponding alcohol and nitrous acid.

3. The process of claim 2, in which the hydrolyzed solution is neutralized to form the metal salts of nitrous and nitric acid.

4. The process of claim 1, in which the dialkylacylamide is dimethylformamide.

5. The process of claim 1, in which the monohydric alcohol is isopropanol.

6. A process for the separation and recovery of the chemical components of a cellulosic regenerating solution containing a dialkylacylamide, a lower aliphatic monohydric alcohol, a nitrite of said alcohol and nitric acid, said process comprising distilling the solution to remove and recover the alcohol therefrom, hydrolyzing the alcohol nitrite in the remaining solution to convert the alcohol nitrite to the corresponding alcohol and nitrous acid, neutralizing the hydrolyzed solution to form the metal salts of the nitrous and nitric acid and distilling the solution to remove and recover the remaining alcohol, the dialkylacylamide and the nitrite and nitrate salts.

7. The process of claim 6, in which the recovered nitrite and nitrate salts are decomposed by pyrolysis to nitrogen dioxide.

8. The process of claim 6, in which the hydrolyzed solution is neutralized with an alkali metal or alkaline earth metal oxide or hydroxide.

9. The process of claim 8, in which the metal oxide is calcium oxide.

10. The process of claim 7, in which the hydrolyzed solution is neutralized with calcium oxide and the recovered salts are calcium nitrite and calcium nitrate, the salts being decomposed by pyrolysis to nitrogen dioxide and calcium oxide.

11. The process of claim 6, in which the concentration of nitric acid in the cellulosic regenerating solution is from 1 to 12% by weight.

* * * * *